J. V. DOBSON.
BRUSH HOLDER.
APPLICATION FILED NOV. 19, 1917.

1,363,644.

Patented Dec. 28, 1920.

WITNESSES:
Ed. V. Herron
F. A. Lind

INVENTOR
John V. Dobson
BY
Wesley G. Carr
ATTORNEY

UNITED STATES PATENT OFFICE.

JOHN V. DOBSON, OF WILKINSBURG, PENNSYLVANIA, ASSIGNOR TO WESTINGHOUSE ELECTRIC & MANUFACTURING COMPANY, A CORPORATION OF PENNSYLVANIA.

BRUSH-HOLDER.

1,363,644.  Specification of Letters Patent.  Patented Dec. 28, 1920.

Application filed November 19, 1917. Serial No. 202,681.

*To all whom it may concern:*

Be it known that I, JOHN V. DOBSON, a citizen of the United States, and a resident of Wilkinsburg, in the county of Allegheny and State of Pennsylvania, have invented a new and useful Improvement in Brush-Holders, of which the following is a specification.

My invention relates to dynamo-electric machines and particularly to current-collecting devices comprising collector rings and brushes.

One object of my invention is to provide apparatus of the character designated which shall have an exceptionally large amount of bearing surface on the collector rings. Another object is to provide a current-collecting device, the conductivity of which shall not be altered by any movement of the collector ring with respect to the frame of the machine.

By my invention, I provide a current-collecting device comprising collector rings the current-collecting surface of which rotates about an axis normal thereto. By this arrangement, the collector rings may be slightly out of true without impairing the efficiency of the collecting devices. Also, I have provided a collecting device, such that the total pressure of the brushes on the collector rings will remain constant during the longitudinal movement of the collector rings, with respect to the frame of the machine.

Figure 2:
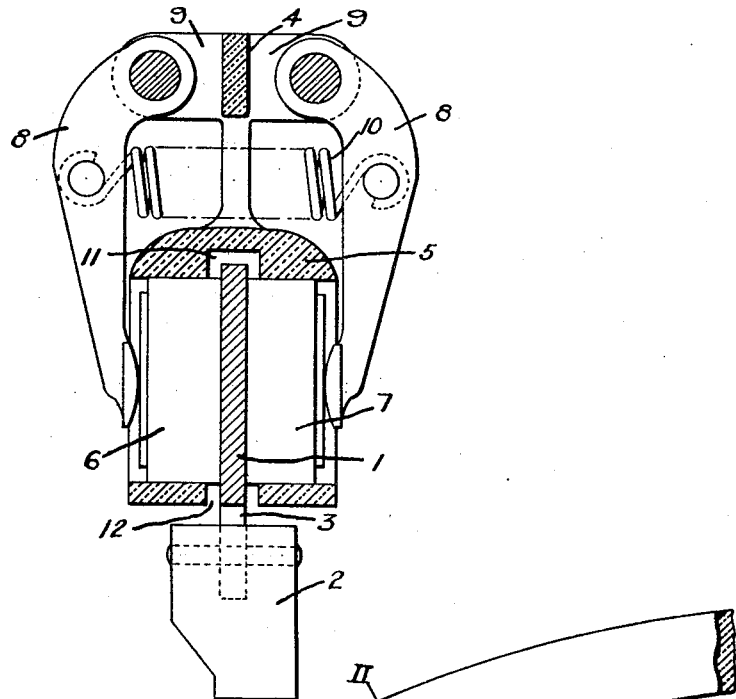
Figure 1:
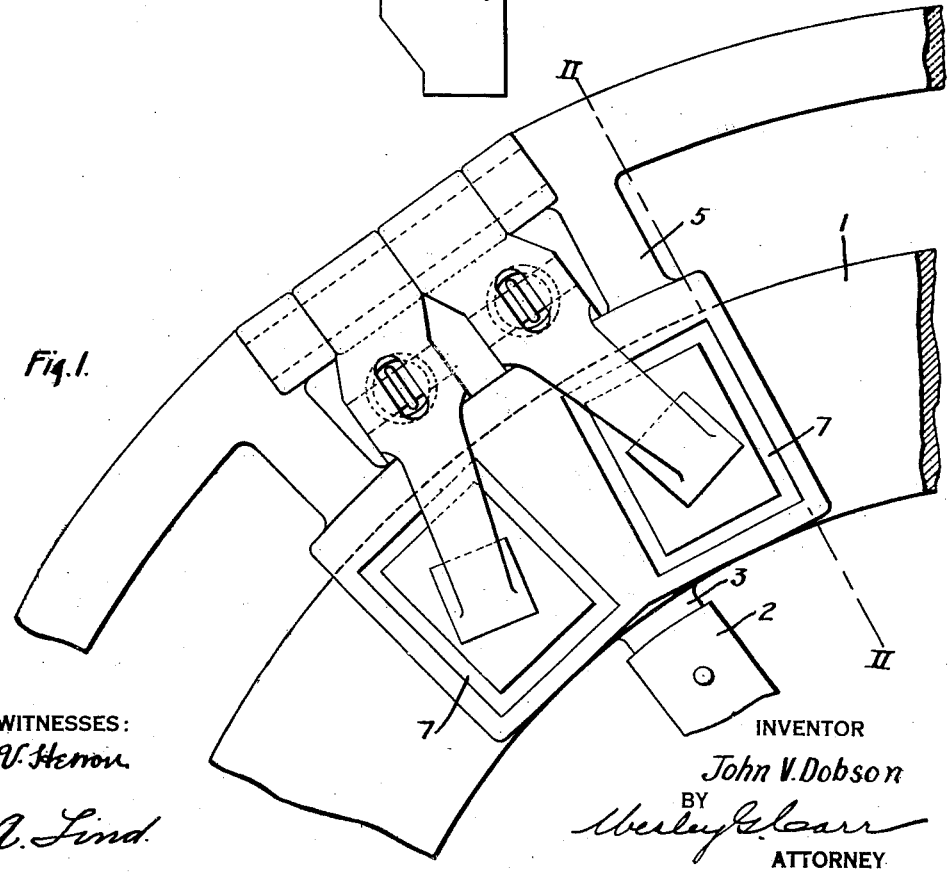

Figure 1 is a side elevational view of a portion of a dynamo-electric machine embodying my invention, and Fig. 2 is a cross-sectional view taken along the line II—II of Fig. 1.

Referring more particularly to the drawings, I have shown a collector ring 1 that is supported upon a spider 2 by means of arms 3. A ring 4 is supported by the machine frame and is concentrically disposed about the collector ring 1 to serve as a support for a brush-holder 5. The brushes are mounted in pairs, one on each side of the collector ring, as shown at 6 and 7, and each brush-holder supports two pairs of brushes.

Pressure transmitting arms 8 are pivotally mounted on the annular member 4 by means of lugs 9. The free ends of the arms 8 are caused to exert pressure upon the brushes 6 and 7 by a helical spring 10 the ends of which are fastened to the arms 8 intermediate the pivotal supports and the brushes.

A considerable displacement of the collector ring 1 may be permitted by the slots 11 and 12 in the brush-holder 5 without disturbing the coöperative relation of the brushes 6 and 7 therewith, since such relation is insured by the spring 10.

From the foregoing description, it will be readily apparent to those skilled in the art that the collector ring, in a machine constructed in accordance with my invention, need not be positioned exactly symmetrical with respect to the axis of the machine in order to operate efficiently and, therefore, less care is required in assembling the parts than is required with the ordinary construction. When the armature of the machine has any longitudinal motion, for instance, in the direction of the brush 7, the collector ring 1 cannot move out of engagement with the brush 6 on account of the pressure-regulating spring 10, which serves to hold the arms 8 in engagement with both brushes, at a uniform pressure, since the spring 10 maintains a uniform pressure on both of its supports.

While I have herein shown one form of my invention, and described in detail one application of the same, it will be obvious to those skilled in the art that it is not so limited but is susceptible of various modifications and changes, and I desire, therefore, that only such limitations shall be placed thereupon as are imposed by the prior art or are specifically set forth in the appended claims.

I claim as my invention:

1. In a current-collecting device, a collector ring, a supporting ring annularly disposed thereabout, and means integral with said supporting ring for providing a brush box on both sides of said collector ring.

2. In a current-collecting device, a collector ring, a supporting ring annularly disposed thereabout, a plurality of brushes disposed in engagement with said collector ring and a plurality of arms adapted to exert pressure on said brushes, said brushes and said pressure arms being both mounted on said supporting ring.

3. In a current-collecting device, a collector ring, a plurality of brushes, a ring annularly disposed thereabout and provided with brush-supporting projections, and a plurality of separate arms adapted to exert pressure on said brushes and pivotally mounted on the main body portion of said brush-supporting ring.

4. In a current-collecting device, a collector ring, a supporting ring annularly disposed thereabout and provided with longitudinally and radially extending lugs, a plurality of brushes disposed in engagement with said collector ring, and a plurality of arms adapted to exert pressure on said brushes, said brushes being mounted on said radially extending lugs and said pressure arms being mounted on said longitudinally extending lugs.

5. In a current-collecting device, a collector ring, a supporting ring annularly disposed thereabout and provided with radial projections, a pressure-transmitting arm pivotally mounted on the main body portion of said supporting ring, one end of said arm being adjacent to said collector ring, and a brush mounted on one of the projections of said supporting ring and held in engagement with said collector ring by said pressure-transmitting arm.

6. In a current-collecting device, a collector ring, a supporting ring annularly disposed thereabout, pressure-transmitting arms disposed at the respective sides of said collector ring in pairs, and pivotally mounted on said supporting ring, brushes mounted on said supporting ring and held in engagement with said collector ring by said pressure-transmitting arms, and a spring having its ends connected to said arms intermediate said pivotal support and said brushes.

7. In a current-collecting device, a collector ring, a supporting ring annularly disposed thereabout, and a unitary structure attached to said supporting ring and comprising a brush-box mounted on each side of said collector ring.

8. In a current-collecting device, a collector ring, brushes in engagement therewith, means for exerting a pressure on said brushes, a supporting ring disposed annularly thereabout and provided with radial and longitudinally extending projections, said radial projections providing a support for said brushes and said longitudinally extending projections providing a support for said pressure exerting means.

In testimony whereof, I have hereunto subscribed my name this 29th day of Oct., 1917.

JOHN V. DOBSON.